F. P. WHITE.
AXLE CONSTRUCTION.
APPLICATION FILED JAN. 18, 1912.
1,044,320.
Patented Nov. 12, 1912.
2 SHEETS—SHEET 1.
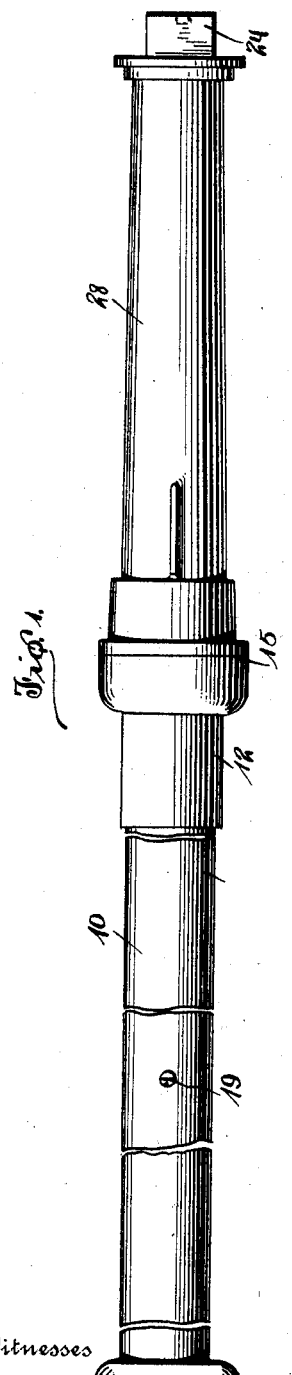
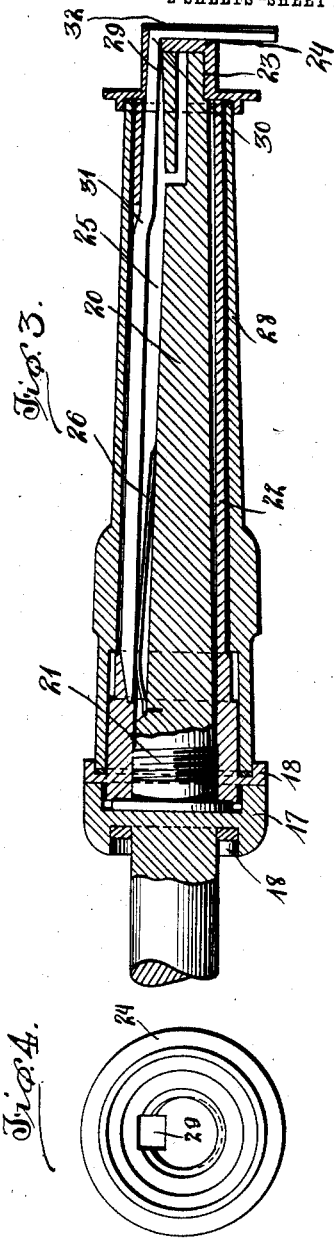
Witnesses
Inventor
F. P. White
By
Attorneys

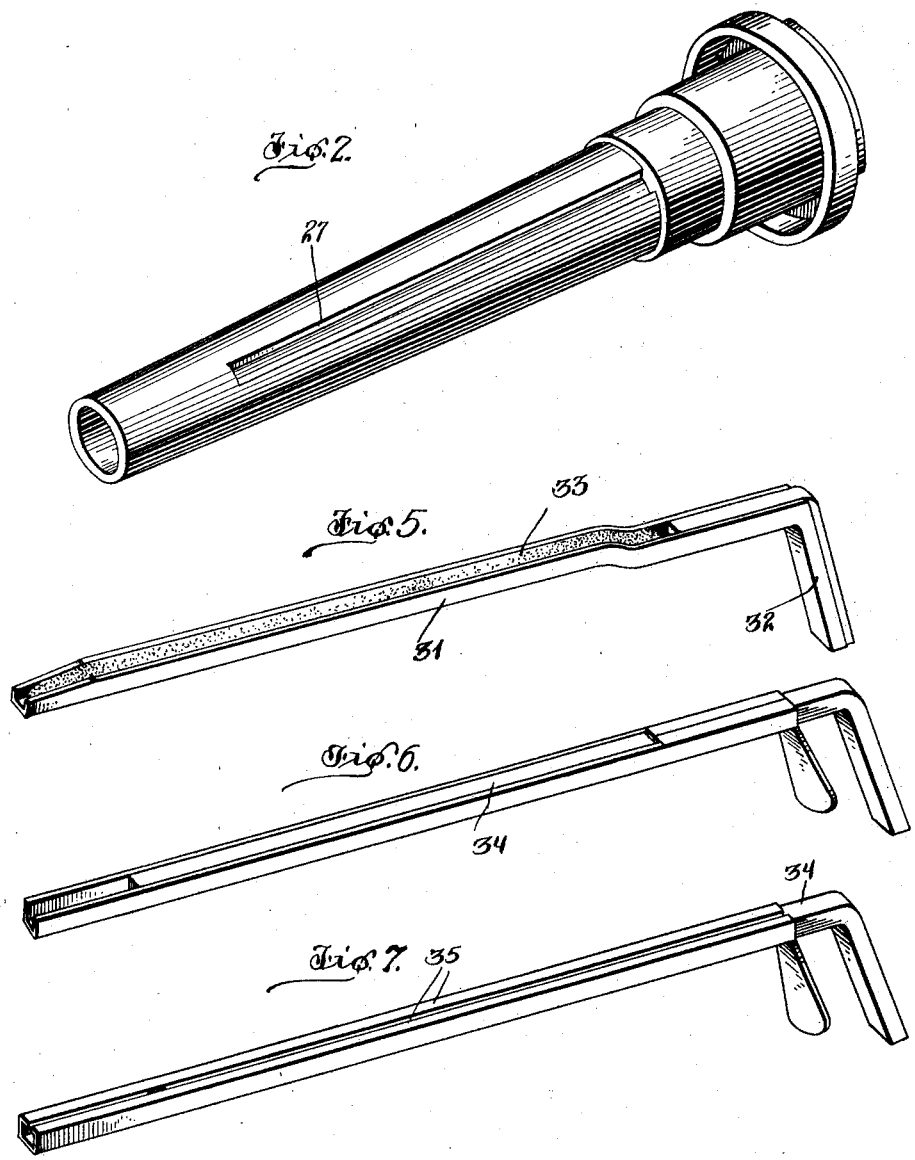

UNITED STATES PATENT OFFICE.

FRANKLIN P. WHITE, OF SHALLOTTE, NORTH CAROLINA.

AXLE CONSTRUCTION.

1,044,320.　　　　　Specification of Letters Patent.　　Patented Nov. 12, 1912.

Application filed January 18, 1912. Serial No. 671,986.

*To all whom it may concern:*

Be it known that I, FRANKLIN P. WHITE, a citizen of the United States, residing at Shallotte, in the county of Brunswick, State of North Carolina, have invented certain new and useful Improvements in Axle Constructions; and I do hereby declare the following to be a full, clear, and exact description of the invention, such as will enable others skilled in the art to which it appertains to make and use the same.

My invention relates to new and useful improvements in vehicle axles and more particularly to self-lubricating spindles formed at the outer ends of the axle and the object of my invention is to improve the construction and increase the efficiency of the same.

A further object of my invention is to provide a novel form of spindle, skein and nut, whereby the wheels may be readily lubricated without the necessity of removing the wheels or nuts from the axle.

With these and other objects in view, the invention consists of certain novel details of construction and combination of parts hereinafter fully described and claimed, it being understood that various modifications may be made in the minor details of construction within the scope of the appended claim.

In the drawings:—Figure 1 is a side elevation of my improved axle and spindle. Fig. 2 is a perspective view of the skein detached from the spindle. Fig. 3 is a detail central longitudinal section of one of the spindles together with its skein and nut and the bushing of the wheel. Fig. 4 is a rear elevation of the nut. Fig. 5 is a perspective of an oiler employed in connection with the structure shown in Fig. 3. Fig. 6 is a perspective of a modified form of oiler. Fig. 7 is a like view of a still further modified form of oiler.

Referring more specifically to the drawings, in which similar reference numerals designate corresponding parts throughout, 10 designates the axle body which may be of any form desired but preferably consists of a metallic tube within the opposite ends of which are received the axle members proper 15, the end sections being connected within the tube in any suitable and well known manner.

Each axle member proper 15 is provided intermediate its length with an integrally formed flange 17, both faces of which are provided with annular grooves 18, the purpose of the inner grooves 18 being to receive the opposite ends of the tubular axle member 10, as will be clearly understood while the outer grooves 18 receive the inner ends of the skeins 22, as will be later more fully described.

The free ends of the axle members are tapered to form spindles 20 which spindles, are threaded at 21 to receive a skein 22 and at 23 to receive a nut 24. Each spindle is further provided with a longitudinally extending channel 25 in the inner end of which is mounted an outwardly bowed leaf spring 26.

The skein employed with this spindle is of the customary type with the exception that it is provided throughout a portion of its length with a longitudinally extending slot 27 which, when the skein is mounted in position upon the spindle registers with the channel thereof. In the drawings I have shown a bushing 28 of the customary type, mounted upon the spindle and held in place thereon by means of the nut 24. The threaded bore of this nut is provided with a longitudinal channel 29 extending completely through the nut and the outer face of the nut is provided with a laterally directed channel 30 which communicates at one end with the channel 29.

In operation the skein is mounted upon the spindle with its slot registering with the channel of the spindle, the wheel is mounted upon the skein and the nut 24 is turned home in which position, its channel 29 forms a continuation of the channel of the spindle. Oil is supplied between the skein and bushing by means of an oiler 31, which, as best shown in Fig. 7 of the drawings, consists of a holder U-shaped in section and preferably formed of sheet metal having one end bent downwardly as at 32 to form a handle. Positioned within the channel of this oiler and extending above the sides thereof is an absorbent pad 33 which in use, is saturated with oil. This oiler is introduced through the aperture formed in the nut and forced along the channel 25 of the spindle with its open side directed outwardly in such a manner that when it passes over the leaf spring 26 said spring will force it through the slot of the skein and so bring the oil soaked pad into engagement with the bearing face of the bushing. The pad holding portion of the oiler is preferably bent upwardly to insure the proper positioning of the pad. When so positioned the handle of the oiler bears within the channel 30 of the nut and serves to prevent the entrance of foreign matter into the same and at the same time to act as a lock for preventing disengagement of the nut, the handle being reinforced by an L-shaped bar as shown to prevent distortion.

In Fig. 8 I have illustrated a modified form of oiler which is similar in construction to the first with the exception that it has no pad and is instead, provided with a plunger 34. In operating this type of oiler the channel of the oiler is first filled with grease, the oiler is then forced into the spindle channel in the manner above described and the plunger is then forced into the channel of the oiler by which means the grease therein contained is pressed outwardly through the slot in the skein. Fig. 9 illustrates a slightly modified form of the oiler shown in Fig. 8, the difference being in providing the side portions of the grease holding channel with inwardly directed flanges 35 the inner edges of which are slightly spaced apart to form a contracted discharge slot for the passage of the grease, this form being somewhat preferable to the form shown in Fig. 8 due to the added facility with which it may be filled merely by forcing its open end downwardly into the grease.

From the foregoing it will be apparent that I have provided a novel form of spindle and skein and also a novel means of introducing lubricant between skein and wheel bushing by means of a channel formed in the spindle and registering with a slot formed in the skein.

It will of course be understood that minor changes in details may be made if desired without in the slightest degree departing from the spirit of my invention.

What I claim is:—

A device of the character described, comprising a spindle having a longitudinally extending channel, an outwardly bowed leaf spring mounted on the inner end of said channel, a skein adapted for attachment to said spindle and provided throughout a portion of its length with a longitudinally extending slot registering with the channel of the spindle, a nut engaging the free end of the spindle and bearing against the free end of said skein, said nut being provided with a squared aperture in its outer end and with a longitudinally extending channel, said aperture and channel being in alinement with the channel of the spindle when the nut is in place, and an oiler adapted for insertion through the aperture of the nut and into the channel of the spindle, said oiler comprising a body portion approximately U-shape in cross section adapted to lie within the channel, the outer end of said body portion terminating in a downwardly extending angular end, the bowed spring within the channel bearing against the bottom of the oiler to press the latter outward.

In testimony whereof, I affix my signature, in presence of two witnesses.

FRANKLIN P. WHITE.

Witnesses:
 OSCAR BENNETT,
 A. N. WHITE.

---

Copies of this patent may be obtained for five cents each, by addressing the "Commissioner of Patents, Washington, D. C."